[15] 3,657,548
[45] Apr. 18, 1972

Parkin

| [54] | TRACKING SYSTEM |
|---|---|
| [72] | Inventor: William J. Parkin, Natick, Mass. |
| [73] | Assignee: Sanders Associates, Inc., Nashua, N.H. |
| [22] | Filed: Jan. 23, 1963 |
| [21] | Appl. No.: 253,504 |
| [52] | U.S. Cl. ..............250/203 R, 250/71.5 S, 250/83.3 R, 250/83.3 H, 250/211, 315/24 |
| [51] | Int. Cl. .........................................................G01s 3/78 |
| [58] | Field of Search ..............250/83.3 IR, 203, 311, 83.3 H; 313/94; 114/14.3; 88/1 FP; 315/24 |

[56] References Cited

UNITED STATES PATENTS

| 2,861,262 | 11/1958 | Pankane ............................250/211 X |
|---|---|---|
| 3,028,500 | 4/1962 | Wallmark ..............................250/203 |
| 3,112,399 | 11/1963 | Chew ...................................250/83.3 |
| 2,124,973 | 7/1928 | Fearing...............................315/24.1 |
| 2,312,761 | 3/1943 | Hershberger .........................315/24 |
| 3,047,767 | 7/1962 | Allured et al............................315/24 |

*Primary Examiner*—Samuel Feinberg
*Assistant Examiner*—H. A. Birmiel
*Attorney*—Louis Etlinger

[57] ABSTRACT

Biasing means are coupled to a radiation responsive, variable impedance detector element to provide a swept sensing apparatus for producing an indication of the presence and location of a remote source of radiation or target without mechanically moving parts.

13 Claims, 5 Drawing Figures

EQUIVALENT CIRCUIT

TRACKING SYSTEM

The present invention relates to optical sensing apparatus and devices. More particularly, the invention relates to infrared sensing apparatus and devices. More especially, the invention relates to infrared detector devices for detecting the presence and location of a source of infrared radiation.

Detector elements which change electrical characteristics in response to radiation are broadly useful in the invention. Of particular use in the invention are detector elements having a variable impedance or resistivity in response to radiation. The change in impedance may be due to the well-known photoelectric effect or to energy absorption in the atomic or quantum mechanical sense.

Photoelectric devices for sensing the presence of infrared energy are broadly classified photovoltaic and photoconductive. The photovoltaic infrared detectors produce a voltage in response to the presence of infrared. The photoconductive detectors provide a variable conductivity in response to the presence of infrared energy.

Radiation absorption materials of the type used for bolometers for radiation intensity measurements epitomize an absorption-type detector. Resistive material of this character is marketed under the name thermistor by Barnes Engineering Company, Stamford, Connecticut.

Typical prior art circuits use a photoconductive infrared detector placed in series with a direct current bias source and a load impedance. The impingement of infrared energy upon the infrared detector cell has the effect of increasing its conductivity to produce a higher voltage across a load impedance. In effect, the cell and the load impedance provide a potentiometer to produce an output direct current signal which is a function of the amount of infrared energy impingent on the cell.

To provide an indication of the location of a target, prior art systems typically utilize a rotating vane or reticle which partially obscures the cell and rotates about the central axis of the cell. The system produces a null error signal when the target is precisely on boresight, that is, along the central axis of the optical cell and its associated optical system. The output voltage across the load impedance is a constant. While the center is located off the axis, the exposure of the cell to infrared energy varies with the position of the vane. In effect, the rotating vane provides a modulation which appears as an alternating current component across the load impedance. The amplitude of the modulating signal is a function of the degree of offset of the target from the boresight axis.

This prior art system is primarily a null seeking system. When the target image is displaced from the boresight axis, an error signal is produced. The error signal is an alternating signal superimposed on the direct current signal. The phase of the error signal indicates, when compared with a reference signal, the error in direction, and the amplitude, the degree of displacement or offset from the boresight axis.

Such prior art systems are subject to the disadvantages of rotating mechanical devices. These disadvantages include lack of reliability and a limitation on the possible information rate. The mechanical limitations on infrared information rate, for example, are quite important in the presence of an intermittent source of radiation.

In an article entitled "Application of the Lateral Photoeffect to a Tracking System" by C.L. Patterson appearing in "Infrared Physics", 1962 volume 2, pages 75–85, Porganson Press, Ltd., Great Britain, the photovoltaic detector element utilizing the so-called lateral photoelectric effect is described. Physically, this system utilizes a photovoltaic detector cell with four terminals. The system, however, is completely distinguishable from the present invention in that it utilizes the photovoltaic effect, that is, it produces an output direct current in response to the impingement of infrared energy.

A modulation signal is produced with the use of a rotating mechanical vane or reticle. The only real advantage of this system is to provide two-dimensional information in the form of a pair of orthogonal signals in the output. The circuitry, however, is enormously complicated in order to provide the desired result.

In contrast, the sensing apparatus of the present invention provides two-dimensional information without any mechanical parts, and furthermore, uses the four terminal connections to the cell to introduce a pair of alternating current bias signals in phase quadrature. This concept is completely alien to the device disclosed by Patterson.

The Patterson system is thus subject to the same inadequacies and disadvantages of the other prior art devices which require a mechanical rotating element to provide an indication of target location.

The expression "radiation responsive, variable impedance", as used herein, includes, but is not limited to, impedance changes due to electromagnetic radiation in its various forms impingent, e.g., upon a detector element. The terms thermoelectric, thermovoltaic, thermoconductive and thermosensitive, as used herein, are analogous to photoelectric, photovoltaic, photoconductive and photosensitive in that a variation in an electrical characteristic takes place in response to radiation of a thermal or optical character. Thermoconductive materials vary in impedance due to absorption of energy whatever the radiation frequency. Such materials, in the first order, vary in impedance with temperature. Since the temperature varies with radiation absorption, the impedance varies in response to radiation. While the invention is typically utilized in conjunction with optical and near optical frequencies, it will be apparent that many types of radiation are well within the scope of the inventions. Examples include electromagnetic particle radiation such as atomic and sub-atomic particles.

In my copending application entitled "Tracking Device", a sensing apparatus and tracking device are disclosed, involving a balancing circuit useful in that context. While the system as presented in my copending application is a substantial improvement over the prior art, the present invention relates to an improvement directed to increasing the flexibility and reducing the complexity of that device.

It is therefore an object of the invention to provide an improved sensing apparatus for producing an indication of the presence and location of a remote source of radiation or target without mechanically moving parts.

A further object of the invention is to provide an improved sensing apparatus of the character described which is reliable in operation.

Yet another object of the invention is to provide an improved sensing apparatus of the character described which is capable of relating high information rate.

Still another object of the invention is to provide an improved sensing apparatus useful in a target tracking system.

Still another object of the invention is to provide an improved target tracking system.

Yet another object of the invention is to provide an improved sensing apparatus of the character described having increased flexibility.

Still another object of the invention is to provide an improved sensing apparatus and tracking system of the character described having substantially reduced complexity.

In accordance with the invention there is provided a sensing apparatus. The apparatus includes a radiation responsive, variable impedance detector element. Biasing means are coupled to the element for providing an alternating current bias signal through the element. Output means are coupled to the element for providing an output signal indicative of the presence of a radiation source. Balancing means are coupled to the element between the biasing means and the element. The balancing means produce a variable reference voltage level for balancing the bias and output signals relative to the level.

In one form of the invention the apparatus includes a radiation responsive, photoconductive detector element. Biasing means are coupled to the element for providing a pair of alternating current bias signals through the element. The bias signals are in phase quadrature. Output means are coupled to the element for providing an output signal indicative of position of a remote radiation source. Balancing means are coupled to the biasing means between the element and the biasing means for each of the bias signals. The balancing means include a variable voltage control for each of the bias signals for producing a variable reference voltage level to balance the quadrature and output signals with respect to the reference level.

In one form of the invention, the element has four input ohmic bias terminals arranged in a rhombic pattern. An output ohmic terminal is centrally disposed with respect to the pattern. Reference phase, bias signal transformer means are provided having a secondary winding coupled to a pair of diametrically opposed, input terminals for coupling the element to a source of alternating current reference phase bias signal. Reference phase balancing means are coupled to the reference bias transformer means with a potentiometer stator coupled in parallel with the secondary winding and having a variable potentiometer electrical connection for producing a variable reference voltage level.

Quadrature phase, bias signal transformer means are provided having a secondary winding coupled to the other pair of the input terminals for coupling the element to a source of alternating current quadrature phase, bias signal in phase quadrature with the reference bias signal. Quadrature phase, balancing means are coupled to the quadrature bias transformer means with a potentiometer stator coupled in parallel with the quadrature bias secondary winding and having a variable potentiometer electrical connection coupled to the first potentiometer connection for producing a variable reference voltage level.

Output means are coupled to the element through the output terminal for providing an output signal indicative of position of a remote radiation source, the quadrature and output signals being balanced with respect to the reference voltage level. The output means include vertical and horizontal position resolution indicator means.

In still another aspect of the invention, a target tracking apparatus is provided. The apparatus includes mount means, including a movable member with two degrees of freedom. The detector element is carried by the member. The output means provide vertical and horizontal drive control signals indicative of position of a remote radiation source or target. Drive means are coupled to the output means and the mounting means for controlling the orientation of the movable member in response to the drive control signal.

Other and further objects of the invention will be apparent from the following description of the invention taken in connection with the accompanying drawings, and its scope will be pointed out in the appended claims.

IN THE DRAWINGS

PRINCIPLES OF OPERATION

In the conventional detection circuit, a photoconductive detector element, for example, a lead sulphide cell, forms part of a voltage divider. Modulated light impinging on the cell produces an electrical output. The voltage gradient across such a cell is linear and the equipotential potential lines, i.e., lines of equal voltages, are perpendicular to the direction of the current flow.

The sensing apparatus of the present invention as distinguished from the prior art provides in effect a rotating field detector. This result is obtained by introducing a pair of alternating current bias signals which are phased in quadrature. By employing a cell having four ohmic terminals connected to the cell in a rhombic pattern, opposing pairs of terminals provide orthogonal axes. With an ohmic terminal disposed at the center of the rhombic pattern, an alternating signal applied to a pair of diagonally opposed colinear terminals produces zero output unless an impedance unbalance occurs between the central terminal and one of the opposed bias terminals. This result in effect produces an output error signal the amplitude of which provides the necessary information to determine the degree of offset or displacement of a source of radiation from the boresight or central axis of the cell. This, of course, is true for one of a pair of orthogonal axes. By introducing another alternating current across an axis physically orthogonal to the first axis as defined by the terminals, the information may be obtained for the other of a pair of orthogonal reference axes.

The effect of introducing a pair of quadrature phased bias alternating current signals to such a cell is to produce a rotating field. Because of the rotating field, a target image off the reference axes produces an error signal which varies in phase as well as amplitude. This phase variation enables the resolution from the resultant output error signal of orthogonal signal components, e.g., vertical and horizontal or azimuth and elevation.

DESCRIPTION AND EXPLANATION OF THE SENSING CIRCUIT IN FIGS. 1 & 2.

Figure 1:
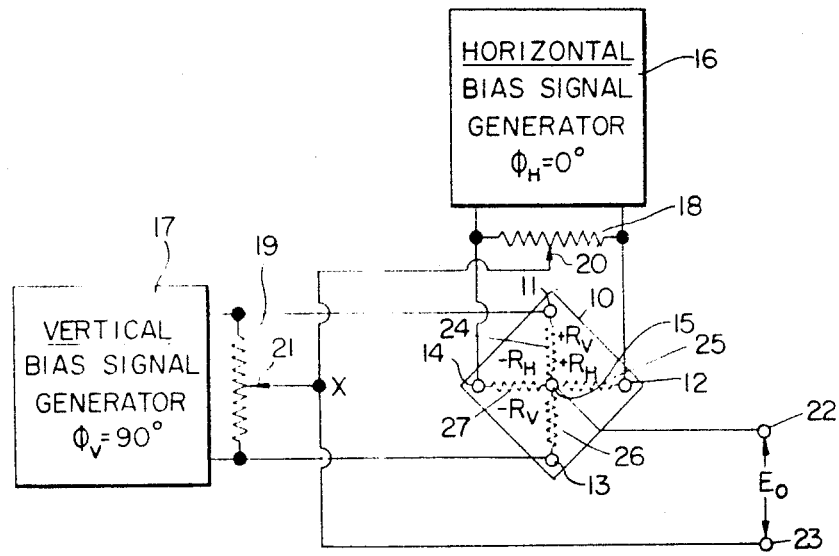
FIG. 1 is a schematic circuit diagram of a sensing circuit illustrating the principles of the invention.

Referring now to the drawings and with particular reference to FIG. 1, there is here illustrated a schematic circuit diagram of a sensing apparatus illustrating the principles of the invention. Here a radiation responsive, variable impedance detector element, such as a photoconductive or thermoconductive element, provides the basic sensing element for the circuit. The element is shown coupled to a pair of quadrature phased bias signal generators. Balancing means potentiometers are coupled in parallel with the bias generators.

Thus a photoconductive detector element 10 having four input ohmic bias terminals 11, 12, 13 and 14 disposed in a square, or more generally a rhombic, pattern and a centrally disposed, output ohmic terminal 15 provides the basic sensing element. Biasing means, here designated as a horizontal bias signal generator 16 and vertical bias signal generator 17, are each coupled to a pair of diametrically opposed input bias terminals. The generator 16 couples a reference or 0° phase bias signal to the diagonally opposed input bias terminals 12 and 14 of the element 10. The generator 17 couples a quadrature or 90° phase bias signal to the other two input bias terminals 11 and 13. The bias signals are thus in phase quadrature.

A balancing means, here shown including potentiometer stators 18 and 19, are coupled respectively between the biasing means generators 16 and 17 and the element 10. The potentiometers or variable resistors have variable electrical connections 20 and 21 coupled respectively to the stators 18 and 19. The variable connections are joined at a junction indicated as X. An output signal $E_o$ appears between the terminals 22 and 23. The terminal 22 is connected directly to the output terminal 15 of the element 10 and the terminal 23 is connected to the junction point X. The balancing means are thus coupled to the bias means between the element and the bias means for each of the bias signals. The balance means include a variable voltage control for producing a variable reference voltage level to balance the quadrature and output signals with respect to the reference level. The internal equivalent resistance of the detector element or photocell is indicated in dashed lines by the phantom lumped constant resistors 24, 25, 26 and 27 connected between the element output terminal 15 and the input bias terminals 11, 12, 13 and 14, respectively. The resistors 24, 25, 26 and 27 are also indicated as $+R_V$, $+R_H$, $-R_V$ and $-R_H$, respectively. The phantom resistors are helpful in describing a physical pair of orthogonal reference axes with respect to which the position of a point of received energy may be indicated.

Figure 2:
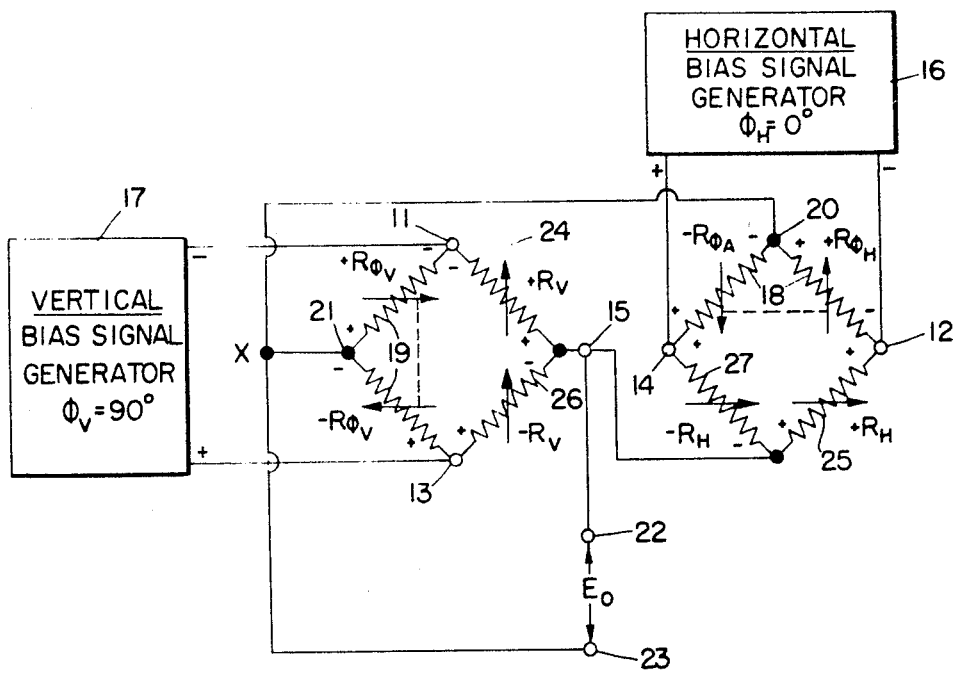
FIG. 2 is an equivalent circuit of the circuit in FIG. 1.

Referring now to FIG. 2, the equivalent circuit of the circuit in FIG. 1 is illustrated. Like elements in FIG. 2 have the same reference numerals as in FIG. 1. The following discussion is with reference to the vertical circuits in both FIGS. 1 and 2. The circuit, as shown, is presented as a pair of bridge circuits illustrating the independence of control or adjustment of the vertical and horizontal circuits relative to a reference voltage level. Voltage polarities shown are for a given instantaneous condition.

The potentiometer stators are shown with the elements $\pm R_\phi$ variable in an inversely coupled manner to correspond with the variation in resistance attributable to motion of the variable electrical connections 20 and 21. The resistors marked $\pm R_V$ and $\pm R_H$ are equivalent lumped constant resistors which vary in accordance with impingent radiant energy.

With no optical signal impingent on the photocell 10, that is, under dark current conditions, the output signal $E_o$ between the terminals 22 and 23 can be any predetermined amount. The signal represented by $E_o$ is a composite signal which includes both horizontal and vertical information, or, more generally, orthogonally resolvable phase components. In the simplest case the variable potentiometer electrical connection 21 can be varied in order to balance the vertical bias signal and output signal $E_o$ relative to the reference voltage level at the point X to produce, for example, zero vertical voltage output between the terminals 22 and 23. Similarly, the variable connection 20 may be adjusted to produce a zero horizontal voltage output. In this manner the quadrature and output signals are balanced relative to the reference voltage level at the point X. Note that with respect to the point X the reference or horizontal bias signal can be adjusted independently from the quadrature or vertical bias signal.

It will be apparent that the dark current condition corresponds with uniform light applied throughout the cell. The circuit as illustrated responds to an unbalance signal of some kind in order to produce an output signal. The balance condition described above is determined for the purpose of producing an output signal in response to an unbalance of an impingent optical signal. A spot of light falling on the boresight axis illuminates the surrounding area uniformly and symmetrically to produce no unbalance. A spot of light falling between the terminals 15 and 11 along the vertical axis has the effect of reducing the resistance $+R_V$ to produce unbalance since the resistance $-R_V$ is unaffected.

Assume an input voltage, for example, of 100 volts appearing between the terminals 11 and 13, then the voltage potentials for a balanced condition will be equal and opposite for the circuit taken with respect to the terminals 22 and 23. For the balanced condition the potential across each resistor is 50 volts. Starting with the terminal 22, the voltage across the resistor $+R_V$ is equal and opposite to the voltage across the resistor $+R_{\phi_V}$. Similarly the voltage across the resistor $-R_V$ is equal and opposite to that across the resistor $-R_{\phi_V}$.

Now consider an unbalance between the bias voltages appearing across the resistors $+R_{\phi_V}$ and $-R_{\phi_V}$, for example, a voltage across $+R_{\phi_V}$ of 10 volts. Then the voltage across $-R_{\phi_V}$ is 90 volts. Starting from terminal 22 the voltage across $+R_V$ is +50 volts added to the negative 10 volts across $+R_{\phi_V}$ to produce an output voltage of +40 volts. Going the other way from the terminal 22 the voltage across $-R_V$ is $-50$ volts in series with the +90 volts across $-R_{\phi_V}$ to produce again +40 volts. Note that the reference voltage level in this condition may be taken to be 40 volts. If the resistance $\pm R_V$ were internally unbalanced correspondingly in the same proportion, 10 volts would appear across $R_V$ and 90 volts across $-R_V$ to produce an output signal $E_o$ of zero volts for no signal condition.

For the condition in which the voltages across $\pm R_V$ are balanced, light impinging in the region between the terminal 15 and the terminal 11 along the vertical axis tends to decrease the resistance $+R_V$. Assuming that the voltage across the resistor $+R_V$ is +40 volts and across the resistor $-R_V$ is $-60$ volts, the output signal voltage at the terminals 22 and 23 becomes 10 volts. It may be seen that the vertical signal component in the output signal $E_o$ is a function of the variation in impedance of $\pm R_V$ in response to radiant energy.

The resultant 10 volt output signal for an unbalance of 10 volts across $\pm R_V$ with $\pm R_{\phi_V}$ balanced, may be determined by adding the voltages in a similar manner. The +40 volts across $+R_V$ and the $-50$ volts across $R_{\phi_V}$ yield $-10$ volts output; the $-60$ volts across $-R_V$ and the +50 volts across $R_{\phi_V}$ yield again $-10$ volts.

Noting that the output signal $E_o$ is indeed a composite signal including both the vertical and horizontal components, the above analysis is equally appropriate to the circuit associated with the reference or horizontal bias signal generator 16. Once the system is balanced as, for example, by a predetermined setting, the output signal is a function of the unbalance impedance, e.g., due to the displacement of a light spot off the origin. Note that in the region between, but not including, the terminals 15 and 11 a light spot of given intensity may move up and down the axis and vary the output signal in accordance with the sensitivity curve of a given cell configuration. The circuit responds also to a variation of intensity at a given point. For a given intensity the output signal amplitude responds in accordance with displacement from the origin.

As shown particularly in FIG. 2, by simply adjusting the variable potentiometer electrical connections, the output signal reference level may be varied enormously. From the above description it will be apparent that the present invention presents a sensing circuit not only reduced in complexity, but substantially increased in flexibility.

By connecting only one input terminal axis, for example, the vertical axis, the circuit has particular application for one dimensional output signals.

DESCRIPTION AND EXPLANATION OF THE APPARATUS IN FIG. 3

Figure 3:
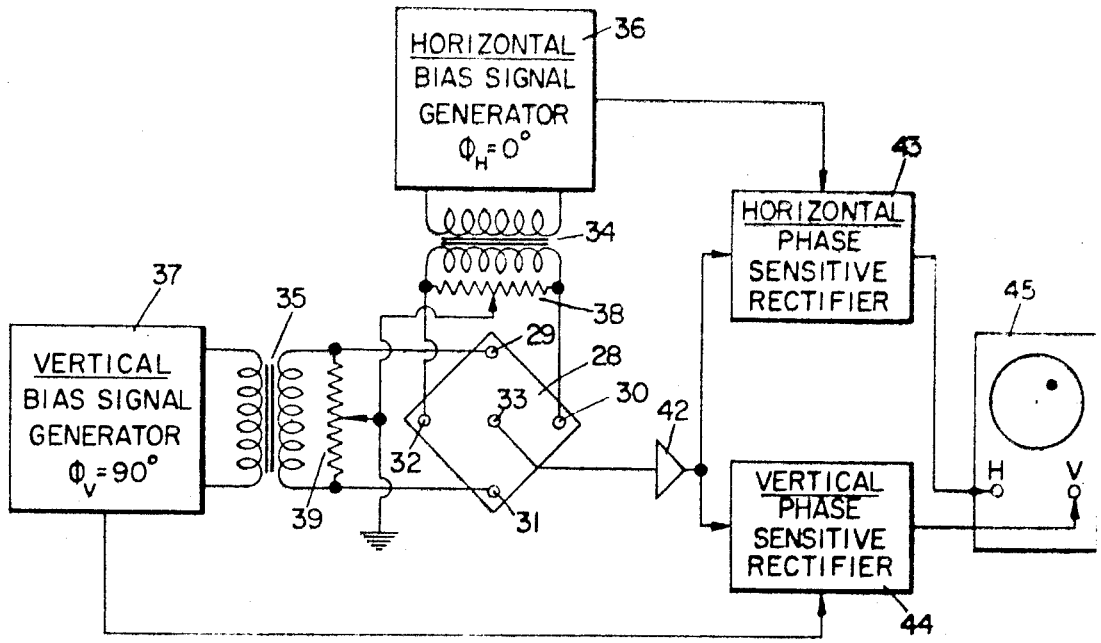
FIG. 3 is a schematic circuit diagram of a sensing apparatus embodying the invention.

Referring now to the drawings and with particular reference to FIG. 3, there is here illustrated a schematic circuit diagram of a sensing apparatus embodying the invention. Here a photoconductive detector element 28 having four input ohmic bias terminals 29, 30, 31 and 32 and a centrally disposed output ohmic terminal 33 provides the basic sensing element for the system.

Biasing means including a pair of transformers 34 and 35 are coupled to the input bias terminals. The transformer 34 is coupled to a source, or horizontal bias signal generator 36, of alternating current having a phase designation $\phi_H = 0°$, and the transformer 35 is coupled to a source, or vertical bias signal generator 37, of alternating current having a phase designation $\phi_V = 90°$. Output means including amplifier and phase resolution circuits are coupled to the output terminal 33. Balancing means including a pair of potentiometers or variable resistors 38 and 39 are coupled in parallel with the secondaries of the transformers 34 and 35, respectively, between the biasing means and the element 28.

More particularly, the primary of the transformer 34 is coupled to the source 36 of alternating current of phase $\phi_H$. The output of the secondary is connected to the diagonally opposed input bias terminals 30 and 32. In parallel with the secondary of the transformer 34 is a potentiometer stator 38. The variable electrical connection of the potentiometer is at electrical ground potential. The terminals 30 and 32 define an axis orthogonal to the axis defined by the terminals 29 and 31. The primary of the transformer 35 is coupled to the source 37 of alternating current of the phase $\phi_V$. The output of the secondary of the transformer 35 is coupled to the input terminals 29 and 31. The stator of the potentiometer 39 is coupled in parallel with the secondary of the transformer 35. The variable electrical connection of the potentiometer 39 is at electrical ground potential. The output of the cell is coupled to the input of an amplifier 42. An output of the amplifier 42 is coupled to a vertical phase sensitive rectifier 43. Another output of the amplifier 42 is connected to a horizontal phase sensitive rectifier 44. The phase sensitive rectifiers or phase detector are conventional circuits of the type disclosed in the publication "Control System Components", pages 249–266, dated 1958, authors John E. Gibson and Franz B. Tuteur, by McGraw-Hill Book Company, publisher.

The output of the rectifiers 43 and 44 are coupled to the horizontal and vertical input terminals, respectively, of an oscilloscope 45 to provide an indication of the vertical and horizontal signals as a visual spot position error indicator. Here a light spot appears on the face of the Cathode Ray Tube. The spot is displaced in accordance with the motion of a given target. The spot position, and, therefore, apparent error signal is referenced to an arbitrary pair of orthogonal axes. The origin coincides with the boresight axis.

With no external light or radiant energy impingent on the photocell detector element 33, a maximum impedance appears across the cell and the voltages between the input terminals and the output terminals along orthogonal axes exactly balance with respect to the ground reference, and, therefore, produce a null. It is, of course, very difficult physically to introduce a center tap in the transformers or perfectly position the output terminal 33. In order to compensate for physical variations and the resultant electrical unbalance, a balancing circuit is required to provide a null reference.

As noted above, the balancing circuit operates to unbalance the bridge circuit impedance and provide a correction signal in opposition to the apparent physical displacement of the null. Thus, if, for example, with no light impingent on the cell or uniform illumination of the cell, if the indication is off the null in a vertical direction, this indicates the presence of an output signal of phase $\phi_V$ or 90°. A balancing or compensating signal is introduced by varying the electrical ground connection of the potentiometer 39 essentially to provide a signal 180° out of phase with the unbalance signal to restore the null to the origin of, for example, a set of reference axes. More particularly, this is accomplished by varying the electrical ground connection of the potentiometer 39 until the desired vertical position of the light spot is obtained. If there is a displacement of the null from the horizontal origin, the signal is obtained from the potentiometer 38 by varying its electrical ground connection to counteract the horizontal unbalance and restore the apparent position of the null to the origin.

In operation, the cell is used in conjunction with an optical system which focuses, for example, a beam of infrared light to provide a spot of light impingent on the cell, the axis of the optical system being coincident with the boresight axis. With no light impingent on the cell, the quadrature phase bias signals, as noted above, produce a rotating field. Light precisely on the boresight axis is essentially impingent on the area surrounding the terminal 33 and produces no output error signal. When the light spot is displaced from the center of the cell, a resultant error signal is produced which provides an indication of the degree and direction of displacement of the spot from the center of the cell.

A cell useful in a system embodying the invention is typically formed in the following manner:

A blank of transparent supporting material provides a supporting plate. The plate, for example, may be 0.75 inches square. The supporting plate is transparent to the radiant energy of interest. For infrared energy, a quartz plate is suitable. The plate may be, e.g., 0.04 inches thick. A layer of photoconductive material, for example, lead sulphide, is applied to the center area of the plate in the form, for example, of a square of the order of 0.22 inches per side. Within the corners of the square, gold contacts are evaporated onto the lead sulphide. Connection wires are connected to the gold contacts and extend at right angles from the surface. A potting compound is then applied to cover the lead sulphide surface area in order to provide a support for the contacts and sensitive material.

The frequency of the bias voltage, i.e., the source of phase $\phi_H$ and phase $\phi_V$ signals, may be, e.g., of the order of 400 cycles.

DESCRIPTION AND EXPLANATION OF THE TRACKING SYSTEM IN FIG. 4.

Figure 4:
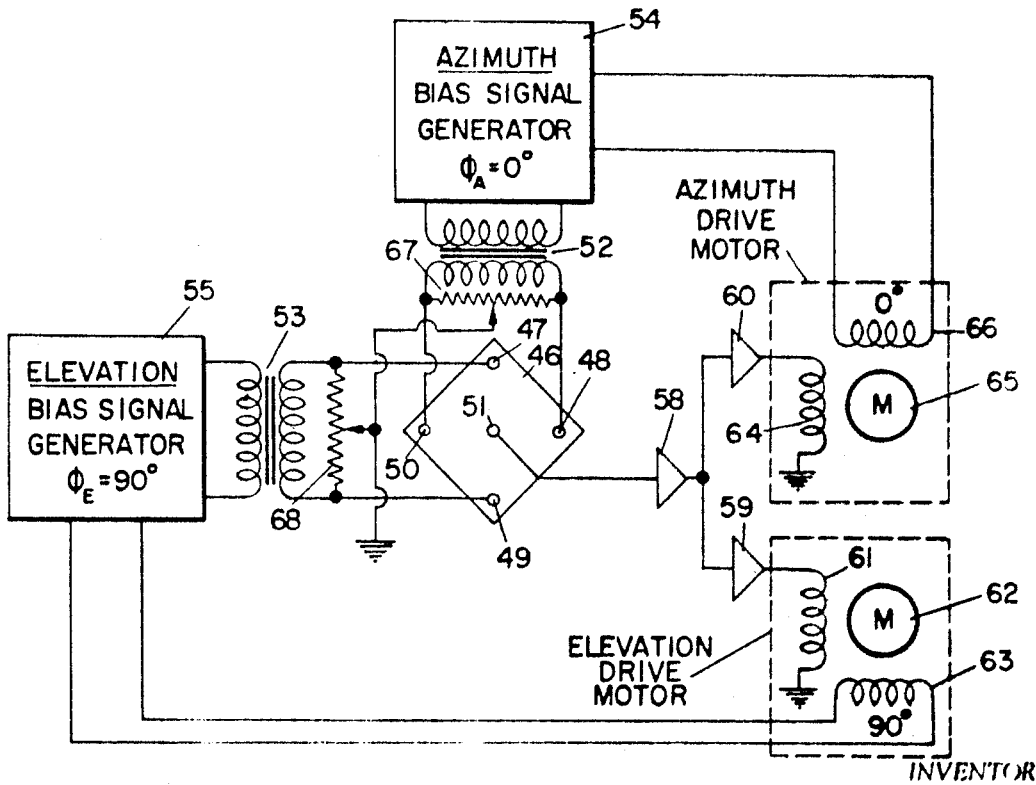
FIG. 4 is a schematic circuit diagram of a target tracking system embodying the invention.

Referring now to FIG. 4, there is here illustrated a schematic circuit diagram of a target tracking apparatus. The tracking apparatus includes a mounting means including a movable member with two degrees of freedom to carry the cell and its associated optical equipment. For purposes of clarity, the mount means and the movable member are not shown. Here again the element carries four input bias terminals arranged, for example, in a rhombic pattern and an output terminal centrally disposed with respect to the pattern. Biasing means are coupled to the element through the input terminals for providing a pair of alternating current bias signals through the element. The bias signals are in phase quadrature. Output means are coupled to the element through the output terminal for providing vertical and horizontal drive control signals indicative of position of a remote radiation source relative, for example, to the boresight axis of the element. Balancing means are coupled to the biasing means between the biasing means and the element for balancing the quadrature signals and provide a null reference. Drive means are coupled to the output means for controlling the orientation of the movable member in response to the drive control signals.

Thus, in FIG. 4, a photoconductive element 46 having input terminals 47, 48, 49 and 50 and an output terminal 51 is shown connected to a pair of bias transformers 52 and 53.

A source of phase $\phi_A$ bias signal is derived from an azimuth bias signal 54 and phase $\phi_E$ from an elevation bias signal generator 55. The phase bias signals are coupled as shown to the primaries of the transformers 52 and 53. The secondary windings of the transformers 52 and 53 are connected to the respective terminal pairs 48, 50 and 47, 49. The output is coupled from the output terminal 51 to the input of an amplifier 58.

The output of the amplifier 58 is coupled to an elevation amplifier 59 and, in parallel, to an azimuth amplifier 60. The output of the amplifier 59 is coupled to a control winding 61 of an elevation drive motor 62. A reference winding 63 of the motor 62 is coupled back to the elevation generator 55. The output of the amplifier 60 is coupled to a control winding 64 of an azimuth drive motor 65. The reference winding 66 of the motor 65 is coupled back to the azimuth generator 54.

A pair of balancing potentiometers 67 and 68 are coupled in parallel respectively with the secondary windings of the transformers 52 and 53. The variable potentiometer electrical connections are at ground potential. The variable potentiometer electrical connections are electrically connected together and the output signal appears at the output terminal 51 with respect to a reference ground voltage potential.

In the system as described, the detector element 46 is mounted on a movable member which is controlled in orientation by the drive motors 62 and 65. When light is impingent upon the cell 46 off its central axis, an output signal is produced which is amplified at the amplifier 58 and applied through the elevation amplifier 59 and azimuth amplifier 60 to the control windings of the motors 62 and 65. The motors are preferably dual phase induction motors. They operate on the principle of providing maximum rotation in a given direction when the phase of the energy on the control winding is 90° out of phase with the energy on the reference winding. Speed of rotation is a function of both the phase difference between the drive control signal on the control winding and the amplitude of the drive control signal. The direction of rotation is a function of the phase difference as well. For example, when the phase difference is −90°, the motor rotates in one direction and when the phase difference is +90°, the motor rotates in the opposite direction.

The indicated phase of each reference winding 63 and 66 of the motors 62 and 65 is 0° and 90°, respectively. Since the phase of each control winding, for maximum torque for a given amplitude, must be at quadrature with its corresponding reference winding, a variable phase control is provided in the amplifiers 59 and 60. As is shown in FIG. 5, a phase capacitor may be placed in series with each reference winding.

When an error signal is applied to the control windings, a correction is made by the elevation drive motor with respect to $\phi_E$ and the azimuth drive motor with respect to $\phi_A$ to reorient the cell along the boresight axis with respect to a source of radiation. This target tracking system is thus a null-seeking system.

DESCRIPTION AND EXPLANATION OF THE CIRCUIT IN FIG. 5

Figure 5:
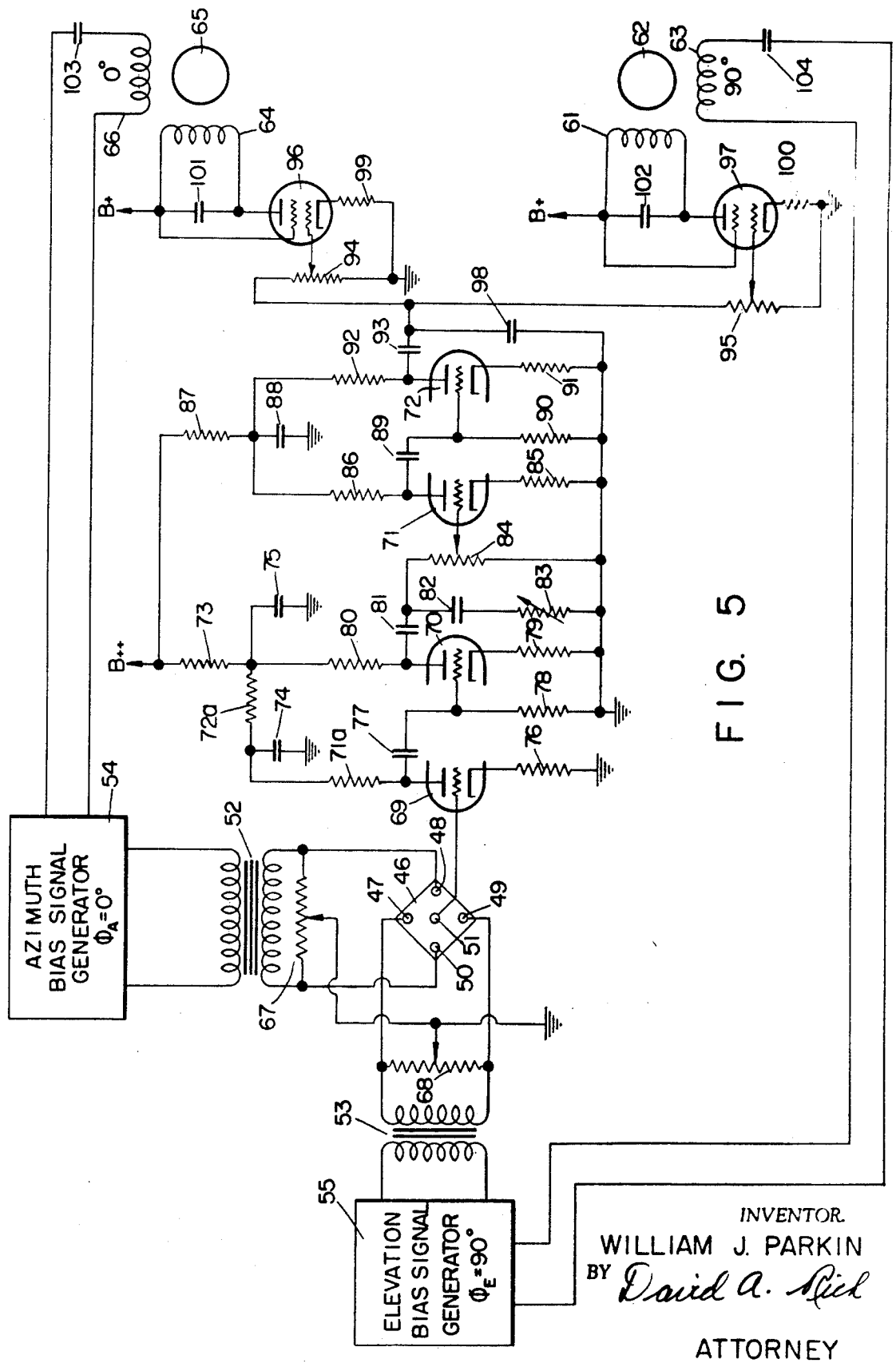
FIG. 5 is a detailed, schematic circuit diagram of the system in FIG. 4.

Referring now to FIG. 5 there is here illustrated a detailed schematic circuit diagram of the tracking system in FIG. 4. The common elements in FIGS. 4 and 5 have like reference numerals.

Here the cell 46 and its associated bias and balance circuitry is shown coupled to a four-stage, resistance coupled amplifier circuit associated with the triode tubes 69, 70, 71 and 72. The output of the four-stage amplifier is coupled through a power amplifier tetrode tube 96 to the azimuth drive motor 65, and, in parallel, to another power amplifier tetrode tube 97 which is coupled to the elevation drive motor 62.

As noted above, the element 46 has its four input bias terminals 47, 48, 49 and 50 coupled to the secondaries of the bias transformers 52 and 53, as shown. Potentiometer stators 67 and 68 are coupled in parallel with the secondaries of the transformers 52 and 53, respectively. The variable electrical connections of potentiometers 67 and 68 are coupled together to electrical ground potential. The azimuth bias signal generator 54 provides a source of reference phase, $\phi_A = 0°$, bias signal coupled to the primary of the transformer 52 and the elevation bias signal generator 55 provides a source of quadrature phase, $\phi_E = 90°$, bias signal coupled to the primary of the transformer 53. The output terminal 51 of the element 46 is coupled directly to the control grid of the resistance coupled amplifier tube 69.

The plate of the triode 69 is coupled to the grid of the triode tube 70. The output of the triode 70 is coupled to a phase compensation circuit and through a variable gain control to the grid of the triode 71; the plate of the triode 71 is in turn coupled to the grid of the triode 72. The plate of the triode 72 is coupled to another phase compensator and through an azimuth variable gain control to the control grid of the azimuth drive control tetrode 96. Another output of the triode 72 is coupled, in parallel, through an elevation variable gain control to the control grid of the elevation drive control tetrode 97.

In detail, the plate of the triode 69 is connected to a plate load resistor 71a and through a pair of series connected voltage dropping resistors 72a and 73 to a source of high positive voltage labelled B++, e.g., 300 volts. The resistors 72a and 73a are bipassed to ground by capacitors 74 and 75, respectively. The cathode of the triode 69 is connected through a degenerative bias resistor 76 to ground. The output of the triode 69 is coupled through a capacitor 77 to a grounded grid resistor 78. The cathode of the triode 70 is connected through a bias resistor 79 to ground. The plate is connected through a plate load resistor 80 to the junction between the resistors 72a and 73.

The plate of the tube 70 is coupled through a capacitor 81 to a variable phase compensation circuit, a series connected capacitor 82 and grounded variable resistor 83. Capacitor 81 is connected to the parallel-connected, variable gain control, a variable resistor 84, the variable connection of which is connected to the grid of the triode 71. The cathode of the triode 71 is connected through a bias resistor 85 to ground and the plate through a plate-load resistor 86 and voltage dropping resistor 87 to B++. A capacitor 88 is connected from the junction between the resistors 86 and 87 to ground.

The output of the triode 71 is coupled through a capacitor 89 to the grid of triode 72, which is coupled through a resistor 90 to ground. The cathode of the triode 72 is coupled through a bias resistor 91 to ground, and the plate through a plate load resistor 92 to the resistor 87. The plate of the triode 72 is coupled through a capacitor 93 to a phase compensation capacitor 98 to ground.

The output of the triode 72 is coupled through the capacitor 93 to the grounded azimuth variable resistor 94 and, in parallel, to an elevation amplitude control variable resistor 95. The variable electrical connections of the resistors 94 and 95 are connected, respectively, to the control grids of tetrodes 96 and 97. The screen grids are connected to a source of low positive voltage labelled B+, e.g., 125 volts. The plates are connected to the control windings 64 and 61 of the azimuth and elevation motors 65 and 62, respectively. The cathodes are coupled through bias resistors 99 and 100 to ground. The windings 64 and 61 have capacitors 101 and 102 connected in parallel. The reference winding 66 of the azimuth drive motor 65 is coupled through a capacitor 103 to the azimuth bias signal generator 54. The reference winding 63 is coupled through a capacitor 104 to the elevation bias signal generator 55.

As noted above, the drive motors 65 and 62 are mechanically coupled to the mounting means for the cell 46 to orient the boresight axis in accordance with the position of a remote radiation source. The phase compensation resistor 83 is varied to compensate for phase shift caused by the electrical circuitry. The phase adjustment is in addition to the fixed compensation provided by capacitor 98. The overall gain of the system is adjusted by the potentiometer 84. Independent amplitude adjustments for the azimuth and elevation drive control signals are provided by the potentiometers 94 and 95, respectively. The degree of power amplification required for drive motors is not necessary for a spot position indicator circuit of the type illustrated in FIG. 3. The circuit in FIG. 5 may be modified by eliminating the power amplifiers and substituting phase sensitive rectifiers coupled to the vertical and horizontal terminals of cathode ray tube oscilloscope to provide a spot position indicator.

In a tracking system actually built and tested, the bias signals were provided by quadrature bias signals at a frequency of 400 cycles. The voltage inputs to the transformers 52 and 53 and motor windings 61 and 64 was approximately 110 volts. The output of the transformers 52 and 53 was approximately 50 volts.

The cell 46 was fashioned as noted above and exhibited 500,000 ohms between the output terminal 51 and each of the input terminals 47–50 under dark current condition.

Values for other components were chosen as follows:

| | | |
|---|---|---|
| Triodes | 69,70 | 12AX7 |
| Triodes | 71,72 | 12AU7 |
| Tetrodes | 96,97 | 6AQ5 |
| Potentiometers | 67,68 | 50 Kilohms |
| Potentiometers | 83 | 100 Kilohms |
| Potentiometers | 94,95,84 | 500 Kilohms |
| Resistors | 76,79,85 | 2.2 Kilohms |
| Resistor | 91 | 1.3 Kilohms |
| Resistors | 71a,80,86 | 270 Kilohms |
| Resistor | 92 | 68 Kilohms |
| Resistors | 72a,87 | 20 Kilohms |
| Resistor | 73 | 25 Kilohms |
| Resistors | 99,100 | 240 ohms |
| Resistor | 90 | 70 Kilohms |
| Resistor | 78 | 470 Kilohms |
| Capacitors | 77,81,89,93,98 | 0.01 microforads |
| Capacitors | 74,75,88 | 16 microforads |
| Capacitor | 82 | 0.025 microforads |
| Capacitors | 101,102 | 0.6 microforads |
| Capacitors | 103,104 | 0.3 microforads |
| Motors | 62,65 | 2 phase, 110 v. 400 cycles induction |

The specifications and values above indicated are intended to be representative only and limited to a particular embodiment built and tested. It will be apparent that a wide range of components, voltages, frequencies and circuit parameters may be utilized within the scope of the invention.

From the foregoing discussion, it will be apparent that the invention has broad application in the fields of optical sensing and tracking devices and apparatus.

While there has hereinbefore been presented what at present are considered to be the preferred embodiments of the invention, it will be apparent to those of ordinary skill in the art that many modifications and changes may be thereto made without departing from the true spirit and scope of the invention.

It will be considered, therefore, that all those changes and modifications which fall fairly within the scope of the invention shall be a part of the invention.

What is claimed is:

1. Sensing apparatus, comprising:
a radiation responsive, photoconductive detector element, said element having four input ohmic bias terminals arranged in a rhombic pattern and an output ohmic terminal centrally disposed with respect to said pattern;
reference phase bias signal transformer means having a secondary winding coupled to a pair of said input terminals for coupling said element to a source of alternating current reference phase bias signal;
reference phase balancing means coupled to said reference bias transformer means with a potentiometer stator coupled in parallel with said secondary winding and having a variable potentiometer electrical connection for producing a variable reference voltage level;
quadrature phase bias signal transformer means having a secondary winding coupled to a pair of said input terminals for coupling said element to a source of alternating current quadrature phase bias signal in phase quadrature with said reference bias signal;
quadrature phase balancing means coupled to said quadrature phase bias transformer means with a potentiometer stator coupled in parallel with said quadrature bias secondary winding and having a variable potentiometer electrical connection coupled to the first said potentiometer connection for producing a variable reference voltage level; and
output means coupled to said element through said output terminal for providing an output signal indicative of position of a remote radiation source, said quadrature and output signals being balanced with respect to said reference level, said output means including vertical and horizontal position resolution indicator means.

2. Target tracking system, comprising:
mount means including a movable member with two degrees of freedom;
a radiation responsive, photoconductive detector element carried by said member, said element having four input ohmic bias terminals arranged in a rhombic pattern and an output ohmic terminal centrally disposed with respect to said pattern;
reference phase bias signal transformer means having a secondary winding coupled to a pair of diametrically opposed said input terminals for coupling said element to a source of alternating current reference phase bias signal;
reference phase balancing means coupled to said reference bias transformer means with a potentiometer stator coupled in parallel with said secondary winding and having a variable potentiometer electrical connection for producing a variable reference voltage level;
quadrature phase bias signal transformer means having a secondary winding coupled to the other pair of said input terminals for coupling said element to a source of alternating current quadrature phase bias signal in phase quadrature with said reference bias signal;
quadrature phase balancing means coupled to said quadrature bias transformer means with a potentiometer stator coupled in parallel with said quadrature bias secondary winding and having a variable potentiometer electrical connection coupled to the first said potentiometer connection for producing a variable reference voltage level;
output means coupled to said element through said output terminal for providing vertical and horizontal drive control signals indicative of position of a remote radiation source, said quadrature and output signals being balanced; and
drive means coupled to said output means and said movable member for controlling the orientation of said member in response to said drive control signal.

3. Sensing apparatus, comprising:
a radiation responsive, variable impedance detector element having a first impedance region variable with respect to a second impedance region;
biasing means coupled to said element for providing an alternating current, axis-defining bias signal serially through each of said regions of said element;
output means coupled to said element between said regions for providing an output signal derived from said bias signal indicative of the presence of a radiation source and proportional to the differential impedance between said regions in response to radiation impingent upon one of said regions; and
balancing means coupled to said element between said biasing means and said element, said balancing means enabling continuous adjustment of a variable reference voltage level for balancing said bias and output signals relative to said level when no radiation is present.

4. Sensing apparatus, comprising:
a radiation responsive, variable impedance detector element having a first impedance region variable with respect to a second impedance region, a pair of input, ohmic bias connections and an output, ohmic connection centrally disposed between said bias connections;
biasing means coupled to said element for providing an alternating current, axis-defining bias signal serially through each of said regions of said element;
output means coupled to said element between said regions for providing an output signal derived from said bias signal indicative of the presence of a radiation source and proportional to the differential impedance between said regions in response to radiation impingent upon one of said regions; and
balancing means coupled to said element between said biasing means and said element, said balancing means enabling continuous adjustment of a variable reference voltage level for balancing said bias and output signals relative to said level when no radiation is present.

5. Sensing apparatus, comprising:
a radiation responsive, variable impedance photoconductive detector element having a first impedance region variable with respect to a second impedance region;
biasing means coupled to said element for providing an alternating current, axis-defining bias signal serially through each of said regions of said element;
output means coupled to said element between said regions for providing an output signal derived from said bias signal indicative of the presence of a radiation source and proportional to the differential impedance between said regions in response to radiation impingent upon one of said regions; and
balancing means coupled to said element between said biasing means and said element, said balancing means enabling continuous adjustment of a variable reference voltage level for balancing said bias and output signals relative to said level when no radiation is present.

6. Sensing apparatus, comprising:
a radiation responsive, variable impedance thermoconductive detector element having a first impedance region variable with respect to a second impedance region;
biasing means coupled to said element for providing an alternating current, axis-defining bias signal serially through each of said regions of said element;
output means coupled to said element between said region for providing an output signal derived from said bias signal indicative of the presence of a radiation source and proportional to the differential impedance between said regions in response to radiation impingent upon one of said regions; and balancing means coupled to said element between said biasing means and said element, said balancing means enabling continuous adjustment of a variable reference voltage level for balancing said bias and output signals relative to said level when no radiation is present.

7. Sensing apparatus, comprising:

a radiation responsive, variable impedance detector element having impedance regions variable with respect to other impedance regions;

biasing means coupled to said element for providing a pair of alternating current, axis-defining bias signals, differing in phase, through said regions of said element;

output means coupled to said element between said regions for providing an output signal derived from said bias signal indicative of the presence of a radiation source and proportional to the differential impedances between said regions in response to radiation impingent upon one of said regions; and balancing means coupled between said biasing means and said element for each said bias signal and including a variable voltage control for each said bias signal for enabling continuous adjustment of a variable reference voltage level to balance said bias and output signals with respect to said reference level.

8. Sensing apparatus, comprising:

a radiation responsive, variable impedance detector element having a plurality of first impedance regions variable with respect to a plurality of second impedance regions;

biasing means coupled to said element for providing a pair of alternating current, axis-defining bias signals, said bias signals being in phase quadrature for defining a pair of orthogonal axes, each said bias signal being serially coupled through a first and a second impedance region of said element;

output means coupled to said element between said regions for providing output signals derived from said bias signals indicative of the presence of a radiation source relative to said orthogonal axes and proportional to the differential impedance between said regions in response to radiation impingent upon one of said regions; and balancing means coupled to said biasing means between said element and said biasing means for each said bias signal, said balancing means enabling continuous adjustment of a variable reference voltage level for balancing said quadrature bias and output signals relative to said level when no radiation is present.

9. Sensing apparatus, comprising:

a radiation responsive, variable impedance detector element having a plurality of first impedance regions variable with respect to a plurality of second impedance regions, said element having four input bilateral ohmic connections and a centrally disposed output bilateral ohmic connection;

biasing means coupled to said element for providing a pair of alternating current, axis-defining bias signals, said bias signals being in phase quadrature for defining a pair of orthogonal axes, each said bias signal being serially coupled through a first and a second impedance region of said element;

output means coupled to said element between said regions for providing output signals derived from said bias signals indicative of the presence of a radiation source relative to said orthogonal axes and proportional to the differential impedance between said regions in response to radiation impingent upon one of said regions; and balancing means coupled to said biasing means between said element and said biasing means for each said bias signal, said balancing means enabling continuous adjustment of a variable reference voltage level for balancing said quadrature bias and output signals relative to said level when no radiation is present.

10. Sensing apparatus, comprising:

a radiation responsive, variable impedance detector element having a plurality of first impedance regions variable with respect to a plurality of second impedance regions, said element having four input bilateral ohmic connections and a centrally disposed output bilateral ohmic connection;

biasing means coupled to said element for providing a pair of alternating current, axis-defining bias signals, said bias signals being in phase quadrature for defining a pair of orthogonal axes, each said bias signal being serially coupled through a first and a second impedance region of said element;

output means coupled to said element between said regions for providing output signals derived from said bias signals indicative of the position of a remote radiation source relative to said orthogonal axes and proportional to the differential impedance between said regions in response to radiation impingent upon one of said regions, said output means including vertical and horizontal position resolution indicator means for said remote radiation source; and balancing means coupled to said biasing means between said element and said biasing means for each said bias signal, said balancing means enabling continuous adjustment of a variable reference voltage level for balancing said quadrature bias and output signals relative to said level when no radiation is present.

11. Sensing apparatus, comprising:

a radiation responsive, variable impedance detector element having a plurality of first impedance regions variable with respect to a plurality of second impedance regions, said element having four input bias terminals and a centrally disposed output terminal;

biasing means coupled to said element for providing a pair of alternating current, axis-defining bias signals, said bias signals being in phase quadrature for defining a pair of orthogonal axes, each said bias signal being serially coupled through a first and a second impedance region of said element, said biasing means including a reference phase biasing transformer means having a secondary winding coupled to a pair of said input terminals for coupling said element to a source of alternating current reference phase bias signal and a quadrature phase bias signal transformer means having a secondary winding coupled to the other pair of said input terminals for coupling said element to a source of alternating current quadrature phase bias signal in phase quadrature with said reference bias signal;

output means coupled to said element through said output terminal between said regions for providing output signals derived from said bias signals indicative of the position of a remote radiation source relative to said orthogonal axes and proportional to the differential impedance between said regions in response to radiation impingent upon one of said regions; and balancing means coupled to said biasing means between said element and said biasing means for each said bias signal, said balancing means enabling continuous adjustment of a variable reference voltage level for balancing said quadrature bias and output signals relative to said level when no radiation is present.

12. The sensing apparatus of claim 11, wherein:

each pair of said input terminals is axis-defining and orthogonal to the other pair of said input terminals with said reference secondary winding coupled to one said pair of axis-defining input terminals and said quadrature secondary winding coupled to the other pair of said input terminals; and said balancing means include reference phase balancing means coupled in parallel with said reference secondary winding and have a variable voltage control for enabling a continuous adjustment of a variable reference voltage level, and quadrature phase balancing means coupled in parallel with said quadrature secondary winding and include a variable voltage control for enabling a continuous adjustment of a variable reference voltage level.

13. The sensing apparatus of claim 12, wherein:
said reference and quadrature balancing means each include a potentiometer stator coupled in parallel with its respective secondary winding and having a variable potentiometer electrical connection for enabling said continuous adjustment of said variable reference voltage level.

* * * * *